No. 766,959. PATENTED AUG. 9, 1904.
A. F. MEISSELBACH & W. MEISSELBACH, Jr.
FACING FOR HEADS OF FISHING REEL FRAMES OR SPOOLS.
APPLICATION FILED AUG. 1, 1903.
NO MODEL.
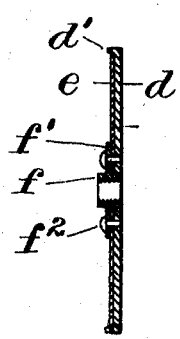
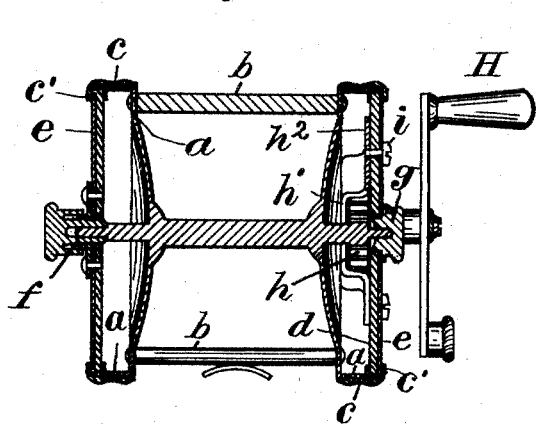
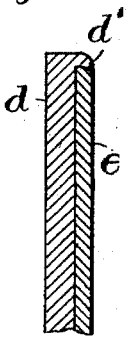
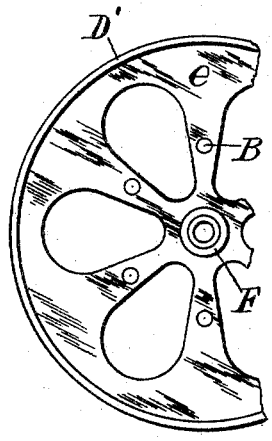
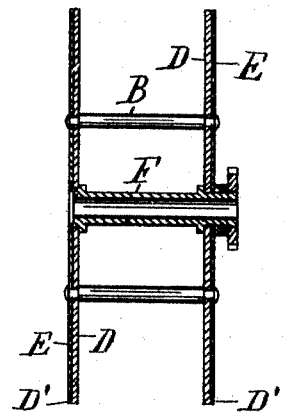

No. 766,959. Patented August 9, 1904.

UNITED STATES PATENT OFFICE.

AUGUST F. MEISSELBACH AND WILLIAM MEISSELBACH, JR., OF NEWARK, NEW JERSEY.

FACING FOR HEADS OF FISHING-REEL FRAMES OR SPOOLS.

SPECIFICATION forming part of Letters Patent No. 766,959, dated August 9, 1904.

Application filed August 1, 1903. Serial No. 167,832. (No model.)

*To all whom it may concern:*

Be it known that we, AUGUST F. MEISSELBACH and WILLIAM MEISSELBACH, Jr., citizens of the United States, and residents of 16 Prospect street, Newark, Essex county, New Jersey, have invented certain new and useful Improvements in Facings for Heads of Fishing-Reel Frames or Spools, fully described and represented in the following specification and the accompanying drawings, forming a part of the same.

The present invention relates to a means of obviating the glitter from the head of the spool and from the end plate of fishing-reels in which the plate which carries the gearing is made rotatable upon the reel-frame, so as to adjust the hand-crank in different relations to the fishing-pole, and thus facilitate the turning of the crank in using the pole for different kinds of fishing. Such a reel is shown and claimed in our application, Serial No. 103,121, filed April 16, 1902, for patent on fishing-reel with adjustable head. The polished surface of such a reel glitters in an objectionable manner so as to frighten the fish, and this glitter we obviate by securing a dark-colored composition facing, like hard rubber or celluloid, upon the heads of the spool or of the adjustable end plate.

It has been common heretofore to apply a facing of vulcanite to the central portion of a reel-head to produce an ornamental contrast with the marginal portion of such head, which is of bright highly-polished metal.

Our construction is designed to wholly prevent the glitter of the polished head, and we have therefore devised a particular construction by which the entire head is covered with a dark-colored composition. For securing such composition facing upon the head we bevel the edge of the facing and form the head with a laterally-projecting flange at the periphery, which can be readily formed by bending over the margin of a sheet-metal disk and can be readily stamped or spun down over the edge of the facing to hold the same in place.

The invention will be understood by reference to the annexed drawings, in which—

Figure 1 is a longitudinal section of a reel having disks detachable at the opposite ends to support the fixtures. Fig. 2 shows one of the disks detached from the reel with the parts in readiness for securing together; and Fig. 3 is a diagram of exaggerated size, showing the junction of the metallic disk and its vulcanite facing more clearly. Fig. 4 is a section of one side of a spool having the heads faced with composition, and Fig. 5 shows one head of such a spool with the edge broken away for want of room upon the drawings.

$a$ designates the rings of the heads, which are secured together by tie-rods $b$. In Fig. 1 the rings are shown of stiff sheet metal, screw-threaded externally, and collars $c$ screwed upon the same to hold the end plates upon the rings detachably. The end plates are shown formed of a metallic disk $d$, having flange $d'$ at its outer edge, and the composition disk $e$ beveled upon its outer edge and set within the flange $d'$ and locked to the metallic disk by spinning or pressing the flange inward over the beveled edge of the composition. The disk at the left-hand side of Fig. 1, as well as in Fig. 2, shows the spindle-bearing $f$ of the spool formed with a flange $f'$ and screws $f^2$ inserted through the flange and composition disk into the metallic disk where the thread firmly engages the metal. It is well known that such an engagement of the screw in metal can be made more durable and accurate than an engagement with a relatively soft composition. The spindle-bearing $g$ of the spool in the right-hand side of Fig. 1 is formed by extending the bearing through the composition disk and the metal disk and flanging the end of the bearing over upon the inner side of the metal disk in the same manner as the metallic disk is flanged at its edge over the composition disk. The right-hand disk is shown with the crank H journaled thereon and the crank-gear $h$ furnished upon the inner side of the metal disk with a bearing $h'$. A screw $i$ is shown inserted through the composition and metallic disks into the foot $h^2$ of the bearing $h'$. Any fixtures that may be required upon the surface of the composition disk may be secured by screws inserted through the same and tapped into the metallic disk.

The collars $c$ in Fig. 1 are shown formed upon the outer end with annular inward projections or flanges $c'$ to clamp the composite disk $d\ e$ upon the rings $a$, and the end plate at either end of the reel-frame may thus be detached from the rings $a$ for cleaning or for access to the spool and its gearing when required. The head of the reel as defined herein consists of the ring $a$ and the plate which closes the end of the reel-frame to support the fixtures.

Figs. 4 and 5 show the application of the invention to the heads of the spool. The head D is formed with flange D' at the edge, burnished or spun over the edge of the composition disk E. The spool is shown of that class having the heads united by tie-rods B, upon which the line is wound, and connected at the center by a sleeve F, the ends of the tie-rods being riveted over upon the composition facing, as well as the end of the sleeve, which is flush with one of the heads. The composition facing is thus secured to the disk at its margin and by the riveting of the tie-rods B.

It is well known that a flange can be bent laterally upon the edge of a disk by a single blow of suitably-shaped dies, and the head of a reel-frame or spool can thus be made of sheet metal and the flange formed upon its margin very cheaply.

Where a reel-head has been covered in the center only with a vulcanite facing, the recess for the facing and the flange at the margin of such recess could be formed only by lathe-turning, which involves the use of thicker metal than that normally required for the head and the employment of expensive labor.

In our construction the location of the flange at the periphery of the head permits it to be formed by stamping-in dies and to be bent over upon the facing-disk by a single blow of suitable circular tools.

By the means described the heads of the spool or end plates of the reel-frame are covered with the dark-colored composition, which prevents the parts which are liable to be exposed to the side of the fish from glittering or reflecting the light, like bright metal.

Any suitable composition of firm texture may be used for the facing-disk.

Having thus set forth the nature of the invention, what is claimed herein is—

1. A fishing-reel having a reel-frame, a head-plate fitted to one end of the reel-frame and formed of a sheet-metal disk $d$ having a flange bent laterally at the margin, a composition facing secured upon the head-plate by such flange, and a screw-collar fitting one end of the reel-frame and provided with means for clamping the head-plate thereto.

2. In a fishing-reel, the combination, with the frame formed of the rings $a$ united permanently by the tie-rods $b$, and screw-threaded externally, of the adjustable head-plate fitted against the outer end of the said frame and formed of the sheet-metal disk $d$ having a flange bent laterally at the margin, and the composition facing $e$ secured upon the head-plate by such flange, fixtures secured upon the composition facing by fastenings extended through the facing and engaging the metallic disk, and the screw-collar $c$ secured upon the ring $a$ and provided with the flange $c$ extended over the composition facing to clamp the head-plate to the ring, substantially as herein set forth.

In testimony whereof we have hereunto set our hands in the presence of two subscribing witnesses.

AUGUST F. MEISSELBACH.
WILLIAM MEISSELBACH, JR.

Witnesses:
WM. FRIEDEL,
THOMAS S. CRANE.